(12) United States Patent
Yu et al.

(10) Patent No.: US 8,941,375 B2
(45) Date of Patent: Jan. 27, 2015

(54) CONTACTLESS DETECTION APPARATUS AND METHOD FOR DETECTING A ROTATION DIRECTION

(71) Applicant: Automotive Research & Testing Center, Changhua Hsien (TW)

(72) Inventors: Chau-Chih Yu, Changhua Hsien (TW); Tsung-Hua Hsu, Changhua Hsien (TW); Jin-Yan Hsu, Changhua Hsien (TW); Chih-Jung Yeh, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 287 days.

(21) Appl. No.: 13/708,484

(22) Filed: Dec. 7, 2012

(65) Prior Publication Data

US 2014/0159710 A1    Jun. 12, 2014

(51) Int. Cl.
*G01B 7/30* (2006.01)
*G01P 13/04* (2006.01)
*G01D 5/244* (2006.01)
*G01D 5/249* (2006.01)
*G01P 3/48* (2006.01)
*G01P 3/54* (2006.01)
*G01D 5/14* (2006.01)

(52) U.S. Cl.
CPC ............ *G01P 13/04* (2013.01); *G01D 5/24404* (2013.01); *G01D 5/2492* (2013.01); *G01B 7/30* (2013.01); *G01D 5/145* (2013.01)

USPC ................... 324/207.25; 324/173; 324/207.2

(58) Field of Classification Search
CPC . G01D 5/145; G01D 5/24404; G01D 5/2492; G01B 7/30; H03M 1/645
USPC ............... 324/51, 55, 173, 174, 200, 207.11, 324/207.25
See application file for complete search history.

(56) References Cited

U.S. PATENT DOCUMENTS

| | | | |
|---|---|---|---|
| 2003/0167857 A1* | 9/2003 | Sugimura et al. | 73/862.333 |
| 2004/0104720 A1* | 6/2004 | Ramirez | 324/207.25 |
| 2011/0115479 A1* | 5/2011 | Blakesley | 324/207.25 |
| 2011/0126639 A1* | 6/2011 | Behrens | 73/862.193 |

\* cited by examiner

*Primary Examiner* — Jermele M Hollington
*Assistant Examiner* — Raul Rios Russo
(74) *Attorney, Agent, or Firm* — Birch, Stewart, Kolasch & Birch, LLP

(57) ABSTRACT

A contactless detection apparatus has a first magnet ring, a second magnet ring, a first magnetic sensor, a second magnetic sensor and a controller. The two magnet rings are respectively mounted on two ends of a torsion shaft. When the torsion shaft rotates, the controller detects the magnetic fields of the two magnet rings through the two magnetic sensors. The controller calculates a twisting torque exerted on the torsion shaft and a rotational angle of the torsion shaft according to the detected magnetic fields at the same time. The detection apparatus of the invention has simple structure. The magnetic fields of both magnet rings do not interfere with each other, such that the detection result of the invention is accurate.

11 Claims, 18 Drawing Sheets

CONTACTLESS DETECTION APPARATUS AND METHOD FOR DETECTING A ROTATION DIRECTION

BACKGROUND OF THE INVENTION

1. Field of the Invention

The present invention relates to a detection apparatus, and more particularly to a contactless detection apparatus and method for detecting a rotation direction.

2. Description of Related Art

In response to the concept of the environmental awareness and the exercise regimen, more and more people take a bike as a daily exercising device or a daily commuting tool. However, the riding distance and the terrain are not proper for everyone. Not everyone has enough physical strength to sustain through the riding action. As a result, an electric bike is manufactured to assist the exerciser with riding a bike.

A conventional electric bike has a throttle switch and a motor installed on a bike. The motor is used to provide a pushing force to move the bike ahead. When the exerciser wants to activate the motor, the exerciser has to manually turn on the throttle switch. However, when the exerciser is riding, the exerciser needs to pay attention on the road ahead and operates the throttle switch at the same time. The complication for riding the electric bike is high.

In addition, the pushing force is not provided immediately. The motor does not provide the pushing force until the exerciser steps on a crank of the bike over a half of a circular spinning movement. As a result, the exerciser still uses great effort to ride on the bike as before. The conventional throttle switch and the motor do not efficiently assist the exerciser with riding the bike.

Responsive to such problems, a conventional detection device is used to detect a twisting torque and a twist angle of a shaft of a bike. The motor can be automatically activated to offer the pushing force according to the detected twisting torque and the twist angle.

With reference to FIGS. 17A and 17B, a first conventional detection device is disclosed. The detection device is adapted to be mounted on an input shaft 81 and an output shaft 82, wherein the input shaft 81 is connected to the output shaft 82 through a coupler 83. The detection device has a first magnet array 811, a second magnet array 821 and a magnetic sensor 84.

The coupler 83 and the magnetic sensor 84 are mounted between the input shaft 81 and the output shaft 82. The first magnet array 811 is mounted around the input shaft 81. The second magnet array 821 is mounted around the output shaft 82. Each magnet array 811, 821 respectively has multiple north poles (N) and south poles (S) arranged alternately. A number of the poles (N, S) of the first magnet array 811 is equal to a number of the poles (N, S) of the second magnet array 821. The north poles (N) and the south poles (S) of the first magnet array 811 are respectively aligned with the north poles (N) and the south poles (S) of the second magnet array 821.

When the input shaft 81 rotates, the input shaft 81 turns the output shaft 82 through the coupler 83. The coupler 83 is designed to flex when a torque is applied to either shaft, resulting in an angular displacement between the input shaft 81 and output shaft 82. The north poles (N) of the first magnet array 811 are not exactly aligned with the north poles (N) of the second magnet array 821, neither are the south poles (S) of the first magnet array 811 and the second magnet array 821. As a result, the magnetic field between the first magnet array 811 and the second magnet array 821 is changed. The magnetic sensor 84 can detect the changed magnetic field. According to the changed magnetic field, a twisting torque exerted on the input shaft 81 and the output shaft 82 can be calculated.

With reference to FIG. 18, to detect a rotational angle of a shaft 85, a first magnet array 851 and a second magnet array 852 are mounted around the shaft 85 and are adjacent to each other, wherein a sensor 86 is mounted between the magnet arrays 851, 852. The first magnet array 851 and the second magnet array 852 respectively have different number of poles (N, S). The first magnet array 851 has N pairs of poles (N, S) and the second magnet array 852 has N+1 pairs of poles (N, S). In an initial condition, the poles (N, S) of the first magnet array 851 are not actually aligned with the poles (N, S) of the second magnet array 852. When the shaft 85 rotates, the poles (N, S) of the first magnet array 851 tend to align with the opposite poles (N, S) of the second magnet array 852. As a result, the magnetic sensor 86 can detect the change of the magnetic field between the first magnet array 851 and the second magnet array 852. According to the changed magnetic field, the rotational angle of the shaft 85 can be calculated.

With reference to FIG. 19, however, the first conventional detection device needs at least three magnet arrays 811, 821, 852 to achieve the detecting action. Each magnet array 811, 821, 852 is composed of many pairs of poles (N, S). The first conventional detection device is not easy to be manufactured and causes high cost. Moreover, the magnetic fields between the three magnet arrays 811, 821, 852 may interfere with each other, such that the detection result of the first conventional detection device is not accurate.

With reference to FIG. 20, a second conventional detection device is disclosed. A top tube 91 and a bottom tube 92 are respectively mounted on a shaft. The top tube 91 and the bottom tube 92 respectively have a disk 911, 921. The disks 911, 921 have equal number of poles (N, S). The second conventional detection device has two Hall sensors 931, 932 respectively mounted beside the poles (N, S) of the two disks 911, 921. The Hall sensors 931, 932 detect the magnetic fields of the poles (N, S) of the disks 911, 921. According to the detected magnetic fields, a twisting torque exerted on the shaft can be calculated.

However, such detection device is only able to detect the twisting torque. A twist angle of the shaft cannot be detected at the same time. Hence, the function of the detection device is limited.

SUMMARY OF THE INVENTION

An objective of the present invention is to provide a contactless detection apparatus. The detection apparatus of the invention has simple structure and detects the torsion and the rotational angle at the same time.

The contactless detection apparatus of the present invention comprises a first magnet ring, a second magnet ring, a first magnetic sensor, a second magnetic sensor and a controller.

The first magnet ring has multiple pairs of a north pole and a south pole and is mounted around a first end of a torsion shaft, wherein a number of the pairs is even.

The second magnet ring has one pair of a north pole and a south pole and is mounted around a second end of the torsion shaft.

The first magnetic sensor is mounted beside the first magnet ring for detecting a magnetic field of the first magnet ring.

The second magnetic sensor is mounted beside the second magnet ring for detecting a magnetic field of the second magnet ring.

The controller is electrically connected to the first magnetic sensor and the second magnetic sensor and has a signal analyzer. The signal analyzer refers to a phase shift of the magnetic field of the first magnet ring to calculate a twisting torque exerted on the torsion shaft and to calculate a rotational angle of the torsion shaft according to the magnetic field of the second magnet ring.

Another objective of the present invention is to provide a method for detecting a rotation direction. The method comprises the following steps of:

detecting a magnetic field generated from a first magnet ring mounted around a torsion shaft by a first magnetic sensor;

detecting a magnetic field generated from a second magnet ring mounted around the torsion shaft by a second magnetic sensor, wherein the first magnet ring and the second magnet ring have different numbers of pairs of poles;

receiving a first potential and a second potential from the first and second magnetic sensors respectively by a controller;

calculating a rotational angle of the torsion shaft according to the second potential by the controller;

comparing the first potential with a reference potential to obtain a potential difference by the controller;

checking a twisting torque exerted on the torsion shaft according to the potential difference by using tables set up in the controller, wherein the tables include a twist angle table and a twisting torque table.

With respect to the detection apparatus of the invention, when the torsion shaft rotates, the two magnetic sensors respectively detect the magnetic fields generated by the first magnet ring and the second magnet ring. The controller then determines the twisting torque exerted on the torsion shaft and determines the rotational angle of the torsion shaft at the same time. According to the determined twisting torque and the rotational angle, the controller can automatically output an assistant torsion signal to a motor. As a result, the motor can automatically provide a pushing force according to the assistant torsion signal to help an exerciser to ride a bike to move ahead.

In conclusion, the detection apparatus of the invention only has two magnet rings. The controller can determine both the twisting torque and the rotational angle by the two magnet rings. Hence, the structure of the detection apparatus is simpler than the conventional one.

In addition, the two magnet rings are respectively mounted around two ends of a torsion shaft and separated from each other by a distance. Therefore, the magnetic fields of both magnet rings do not interfere with each other. The detection result of the invention is more accurate.

DETAILED DESCRIPTION OF THE PREFERRED EMBODIMENT

Figure 1:
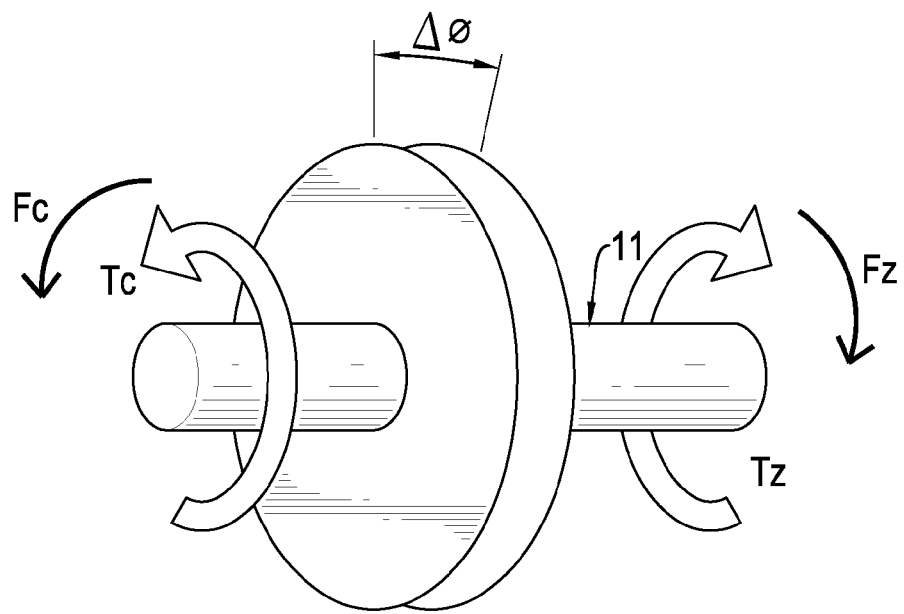
FIG. 1 is an operating view of a shaft sustaining a forward torque and a backward torque.

For convenience of description, a torsion shaft 11 of a bike is illustrated in FIG. 1. The torsion shaft 11 has a first end and a second end respectively connected to a first crank and a second crank, wherein the second end of the torsion shaft 11 is also connected to a back wheel through a gear and a chain. When an exerciser steps on the first crank to exert a forward force (Fz) on the torsion shaft 11, the first end of the torsion shaft 11 sustains a forward torque (Tz). Meanwhile, the chain exerts a backward force (Fc) on the second end of the torsion shaft 11 based on a traction force between the back wheel and the ground, such that the second end of the torsion shaft 11 sustains a backward torque (Tc). By an interaction of the forward torque (Tz) and the backward torque (Tc), a twist angle (Δψ) between the first end and the second end of the torsion shaft 11 occurs. By measuring the twist angle (Δψ), a twisting torque exerted on the torsion shaft 11 can be calculated.

Figure 2:
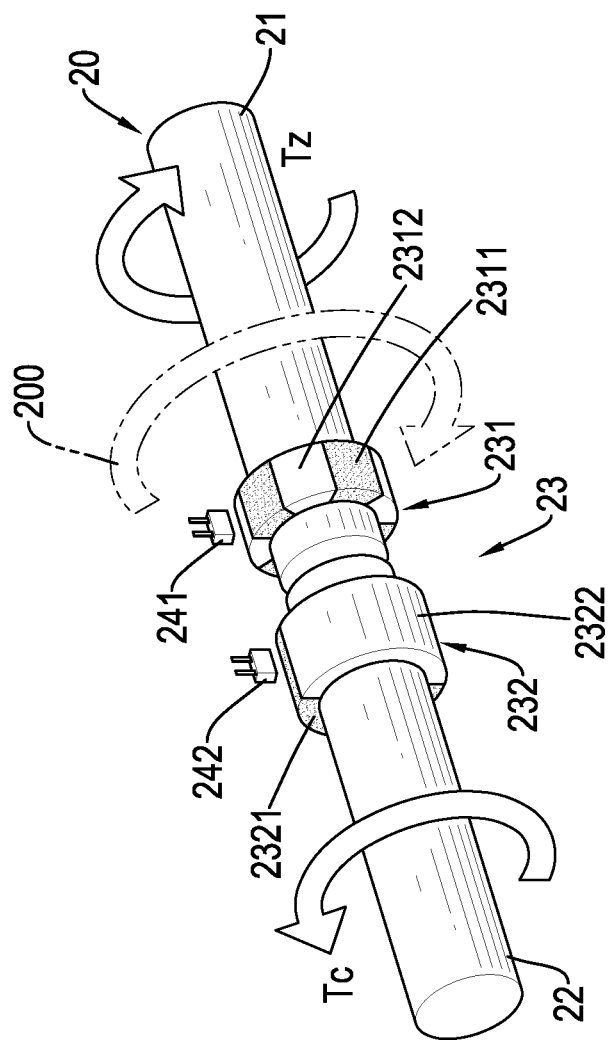
FIG. 2 is a basic operational view of the present invention.
Figure 5:
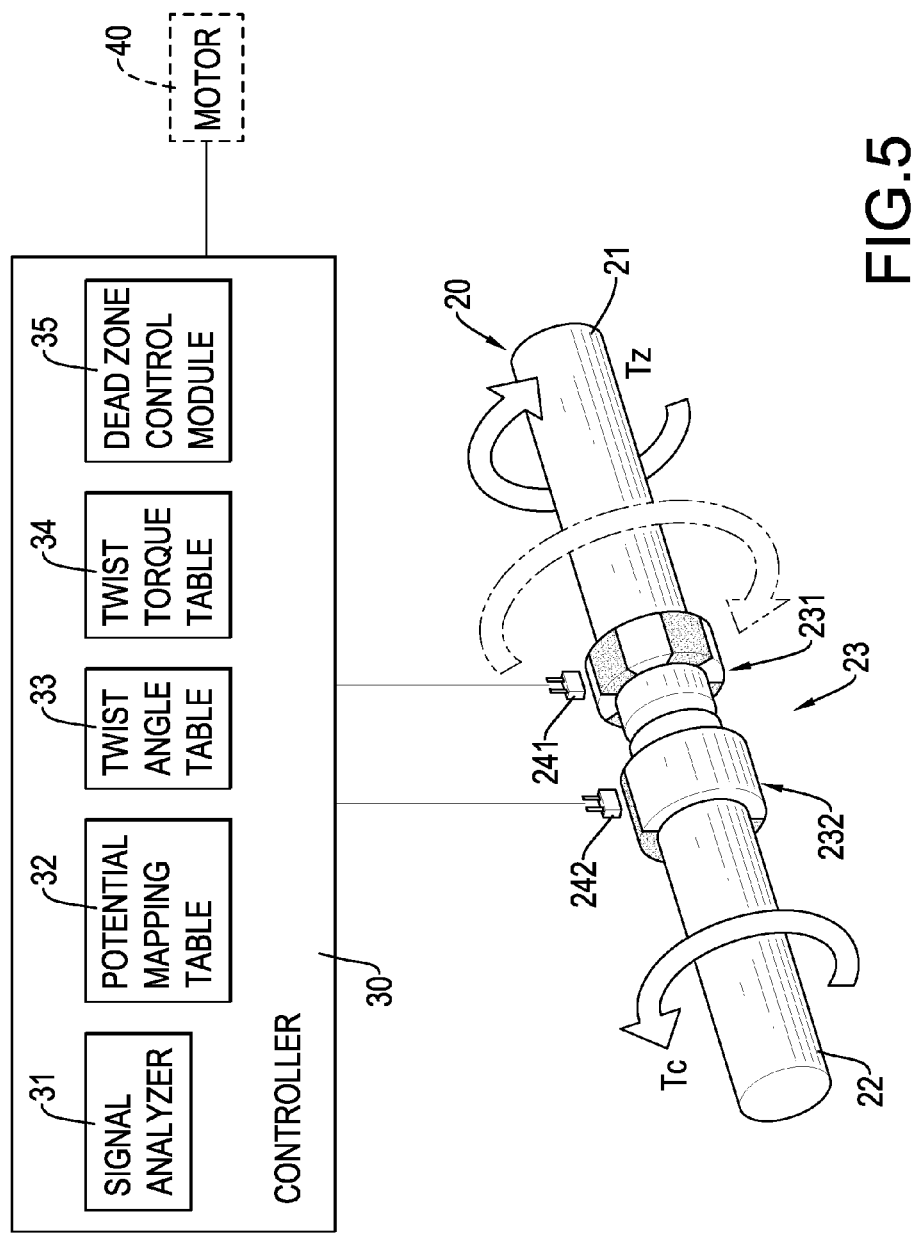
FIG. 5 is an operating view of the present invention.

The detection apparatus of the present invention can be mounted on a vehicle or a bike. With reference to FIGS. 2 and 5, a first embodiment of the present invention is disclosed. The detection apparatus of this invention is adapted to be mounted on a shaft unit 20 of the vehicle or the bike. The shaft unit 20 has a first portion 21 and a second portion 22 opposite to the first portion 21.

The detection apparatus of this invention mainly comprises a first magnet ring 231, a second magnet ring 232, a first magnetic sensor 241, a second magnetic sensor 242 and a controller 30.

The first magnet ring 231 is mounted around the first portion 21 of the shaft unit 20 and has multiple magnet units, wherein each magnet unit has a pair of poles including a north pole 2311 and a south pole 2312. A number of the magnet units is even. In this embodiment, the first magnet ring 231 has four magnet units. The north poles 2311 and the south poles 2312 of the four magnet units are alternately arranged along a movement trace 200.

The second magnet ring 232 is mounted around the second portion 22 of the shaft unit 20 and is adjacent to the first magnet ring 231. The second magnet ring 232 has at least one magnet unit, wherein a number of the magnet unit(s) is odd. In this embodiment, the second magnet ring 232 has only one magnet unit with a north pole 2321 and a south pole 2322. The north pole 2321 and the south pole 2322 are semicircular-shaped and are arranged along the movement trace 200.

The first magnetic sensor 241 is mounted beside the first magnet ring 231 and detects a magnetic field generated from the first magnet ring 231 to correspondingly generate a first potential.

Similarly, the second magnetic sensor 242 is mounted beside the second magnet ring 232 and is aligned with the first magnetic sensor 241 at a particular position. The second magnetic sensor 242 detects a magnetic field generated from the second magnet ring 232 to correspondingly generate a second potential.

The first magnetic sensor 241 and the second magnetic sensor 242 are aligned with each other and respectively detect the magnetic fields at the same time. Therefore, the first potential and the second potential are synchronously generated.

The controller 30 is electrically connected to the first magnetic sensor 241, the second magnetic sensor 242 and a motor 40. The controller 30 has a signal analyzer 31. The signal analyzer 31 receives the potentials from both sensors 241, 242 to calculate the twist angle ($\Delta\psi$), a rotational angle ($\theta$) and a twisting torque of the shaft unit 20. The controller 30 activates the motor 40 according to the twist angle ($\Delta\psi$), the rotational angle ($\theta$) and the twisting torque. The rotational angle ($\theta$) means an axially rotational position of the shaft unit 20. For example, the rotational angle ($\theta$) will be 0 degree if the shaft unit 20 is at an initial position. If the shaft unit 20 finishes a half of a complete circular spinning movement, the rotational angle ($\theta$) will be 180 degrees.

The motor 40 is adapted to connect to a drive system of a bike. When the motor 40 is activated, the motor 40 moves the bike ahead. By the assistance of the motor 40, the exerciser can easily ride the bike with less effort. The following paragraphs describe how the controller 30 works. The first portion 21 of the shaft unit 20 is connected to a crank of a bike. The second portion 22 is connected to a gear as the load. When a user steps on the crank, the first portion 21 rotates to turn the gear. In other words, the first portion 21 sustains the forward torque (Tz) and the second portion 22 sustains the backward torque (Tc).

Figure 3:
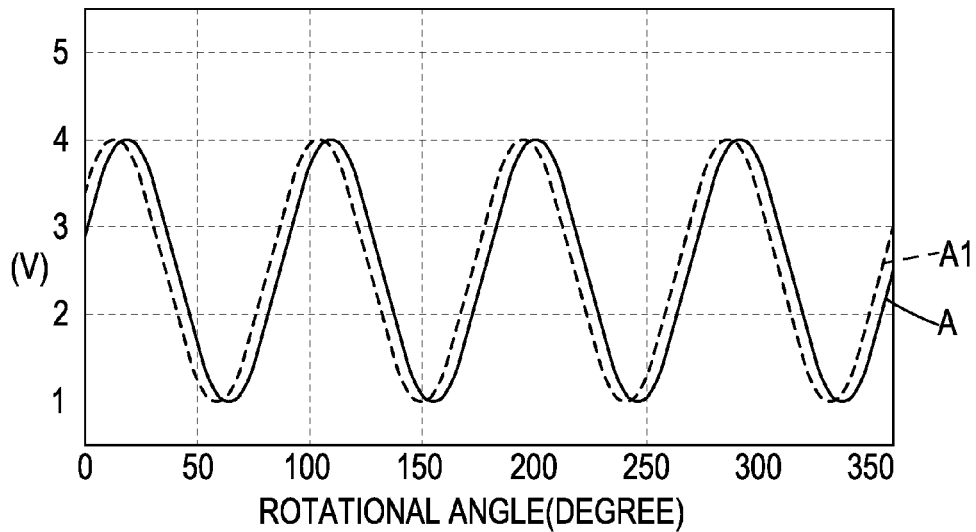
FIG. 3 is a wave diagram of a magnetic field detected by the first magnetic sensor.
Figure 4:
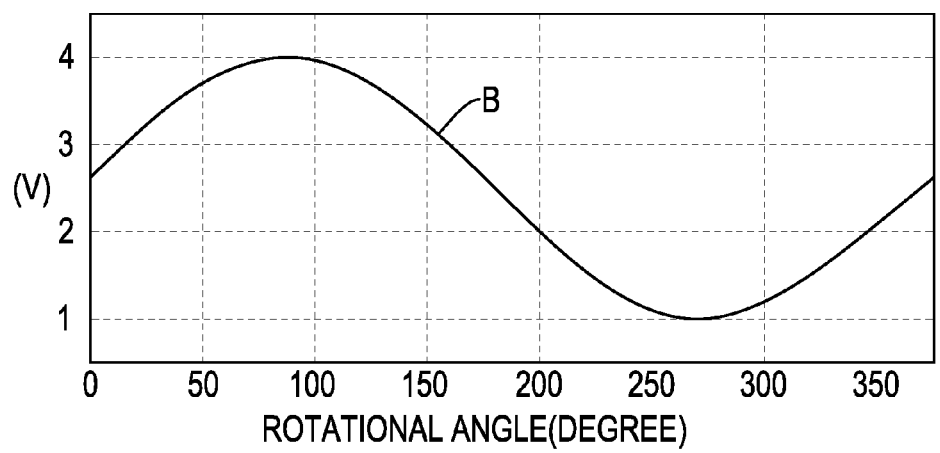
FIG. 4 is a wave diagram of a magnetic field detected by second magnetic sensor.

With reference to FIGS. 3 and 4, when the exerciser steps on the crank, the shaft unit 20 sustains the forward torque (Tz) and spins. When the shaft unit 20 finishes a complete circular spinning movement (360 degrees) under a condition that the backward torque (Tc) is zero, the controller 30 traces out a first signal wave A and a second signal wave B according to the detected first potential and the second potential, wherein the first potentials in the first signal wave A are defined as reference potentials. The first signal wave A has four peaks resulted from the four magnet units of the first magnet ring 231. The second signal wave B has one peak resulted from the one magnet unit of the second magnet ring 232. Each rotational angle ($\theta$) of the shaft unit 20 respectively corresponds to a particular first potential and a particular second potential.

If the backward torque (Tc) is not zero, the first signal wave A1 is plotted in broken lines in the FIG. 3. Apparently, a phase shift between the first signal waves A, A1 occurs when the backward torque (Tc) is not zero, wherein a phase of the first signal wave A1 exceeds a phase of the first signal wave A.

Figure 6A:
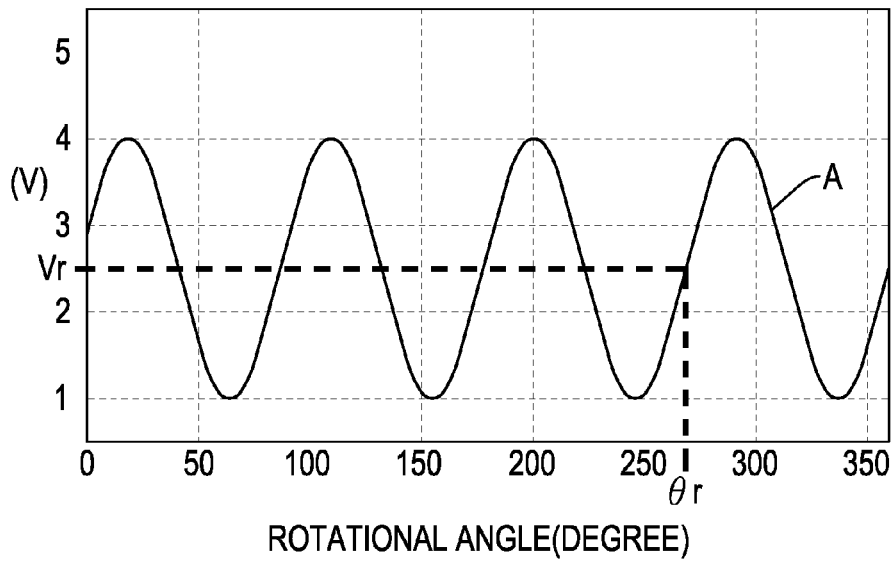
FIG. 6A is a wave diagram of a magnetic field detected by the first magnetic sensor.
Figure 6B:
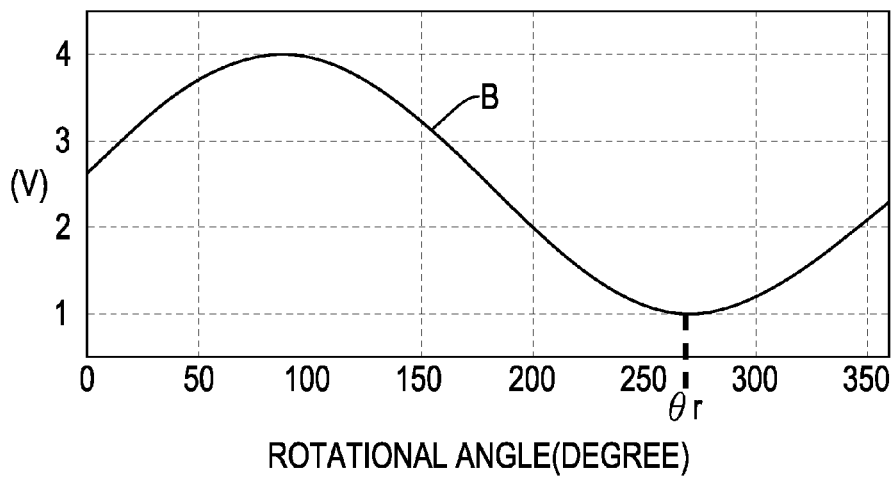
FIG. 6B is a wave diagram of a magnetic field detected by the second magnetic sensor.

The controller 30 has a potential mapping table 32. With reference to FIG. 6A and 6B, under a condition that the backward torque (Tc) is zero, the controller 30 records all of the first potentials and the second potentials corresponding to the torsion shaft's rotational angles ($\theta$) from 0 to 360 degrees when the shaft unit 20 finishes a complete circular spinning movement. Each rotational angle ($\theta$) of the shaft unit 20 corresponds to a particular first potential and a particular second potential. For example, when the rotational angle ($\theta$) of the shaft unit 20 is 270 degrees, the corresponding first potential is 2.3V and the second potential is 1V.

Figure 7:
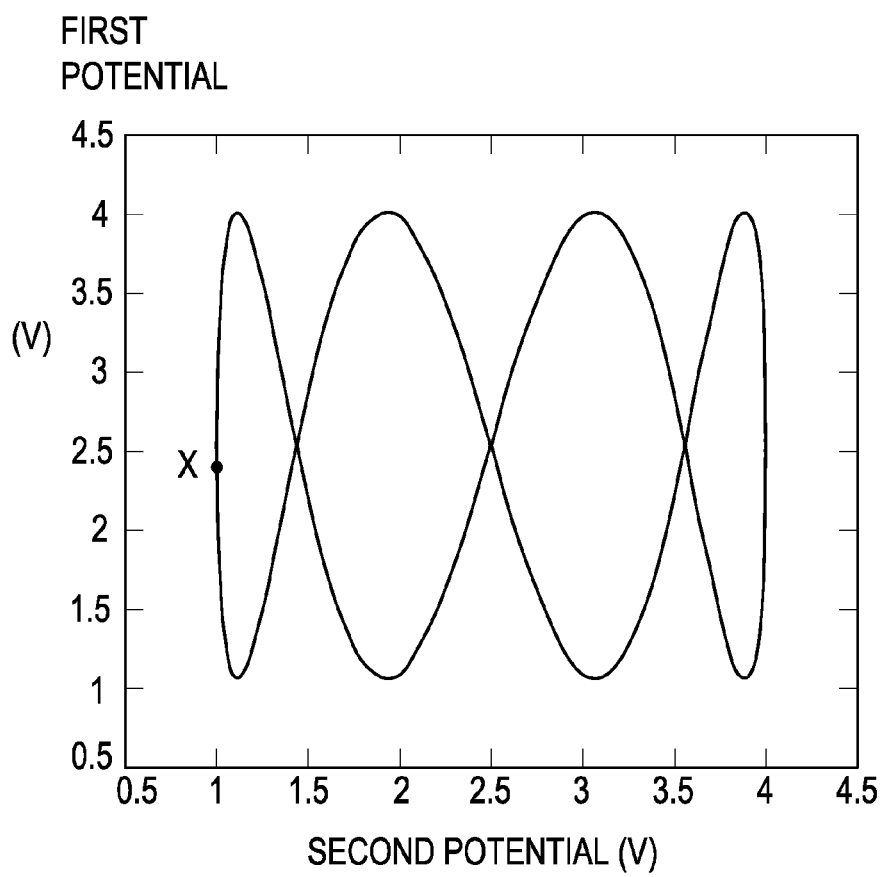
FIG. 7 is a wave diagram of a potential mapping table.

With reference to FIG. 7, each first potential corresponds to a particular second potential. The potential mapping table 32 in the controller 30 is set up based on the first potentials and the second potentials.

With reference to FIG. 6B, when the shaft unit 20 finishes a complete circular spinning movement, the second signal wave B runs only one out of four periods. Because each second potential in the second signal wave B is unique, each second potential corresponds to one particular rotational angle of the shaft unit 20. The signal analyzer 31 recognizes the rotational angle ($\theta$) of the shaft unit 20 according to the second potentials.

Figure 8:
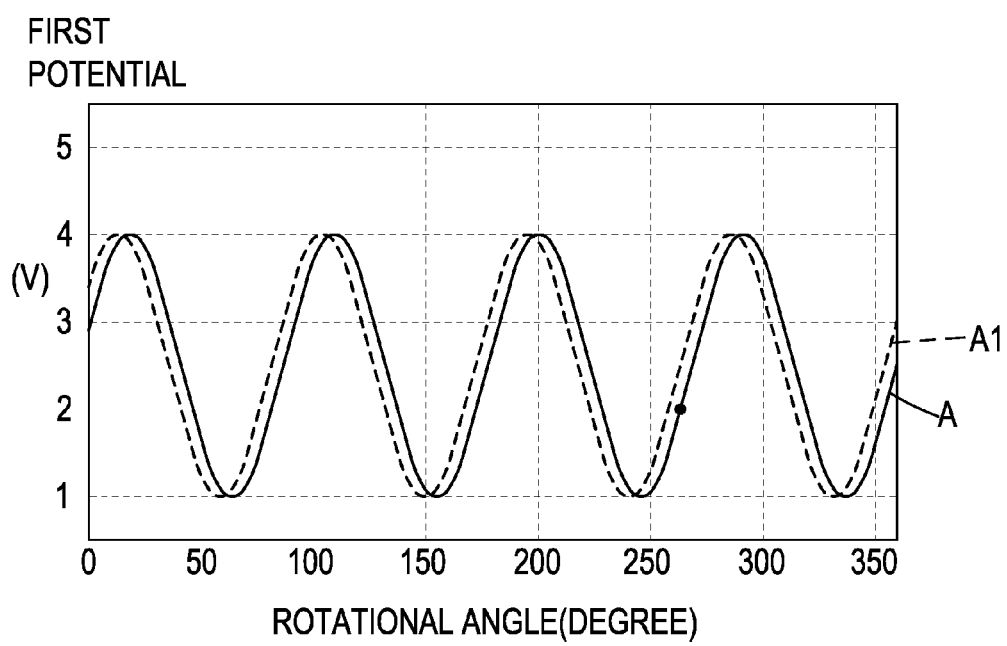
FIG. 8 is a wave diagram with phase shift of a magnetic field detected by the second magnetic sensor.
Figure 9:
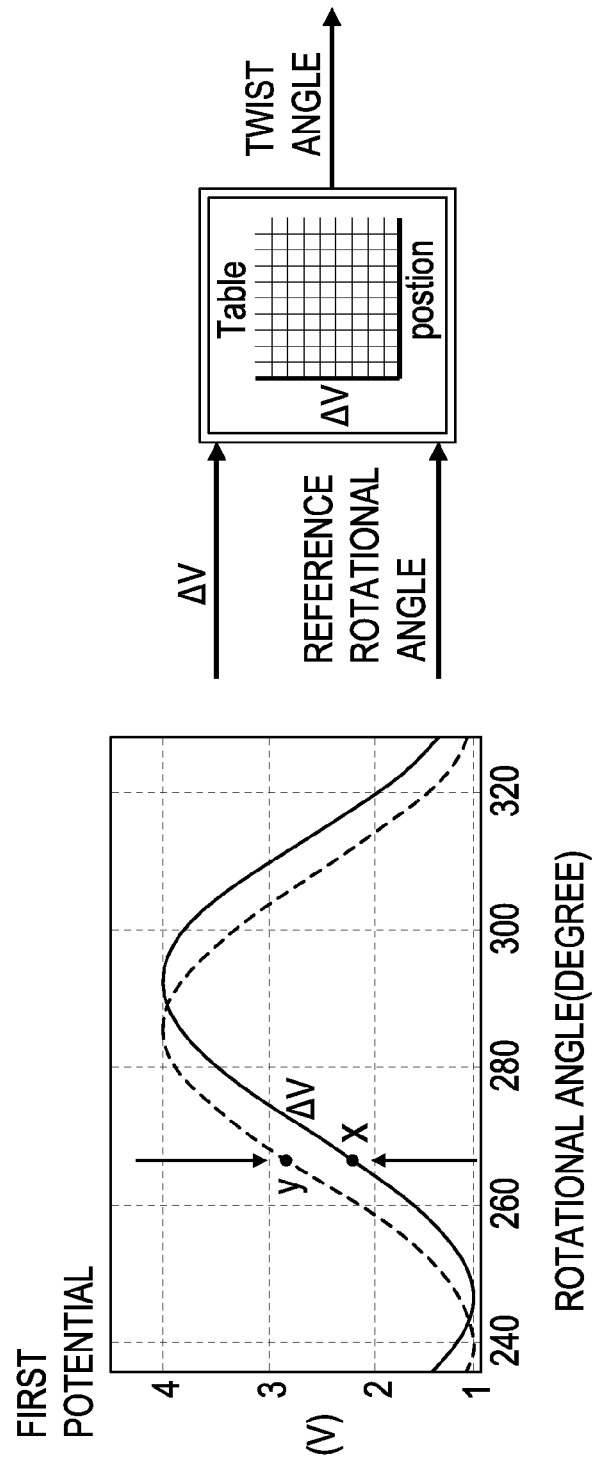
FIG. 9 is an operating diagram for obtaining the twist angle.

With reference to FIG. 8, when the backward torque (Tc) is not zero, the phase shift as mentioned above occurs. With reference to FIG. 9, in the rotational angle ($\theta$) of 270 degrees, the first potential is shifted to 2.9V as plotted at point y from the original potential of 2.3V as plotted at point x, and a potential difference ($\Delta V$) between the points x and y is 0.6V.

The controller 30 stores a twist angle table 33 established based on relationships between the potential differences ($\Delta V$) and twist angles ($\Delta\psi$). Each potential difference ($\Delta V$) corresponds to a twist angle ($\Delta\psi$). When the signal analyzer 31 gets the potential difference ($\Delta V$), the signal analyzer 31 checks the twist angle table 33 to find the corresponding twist angle ($\Delta\psi$) of the shaft unit 20.

The controller 30 further stores a twisting torque table 34 indicating relationships between multiple twist angles ($\Delta\psi$) and multiple twisting torques. Each twist angle ($\Delta\psi$) corresponds to a twisting torque. After the signal analyzer 31 gets the twist angle ($\Delta\psi$), the signal analyzer 31 checks the twisting torque table 34 to find the corresponding twisting torque. As a result, the controller 30 correctly recognizes the twisting torque exerted on the shaft unit 20. In conclusion, the controller 30 of the detection apparatus of the invention is able to simultaneously detect the twist angle ($\Delta\psi$) and twisting torque.

Figure 10:
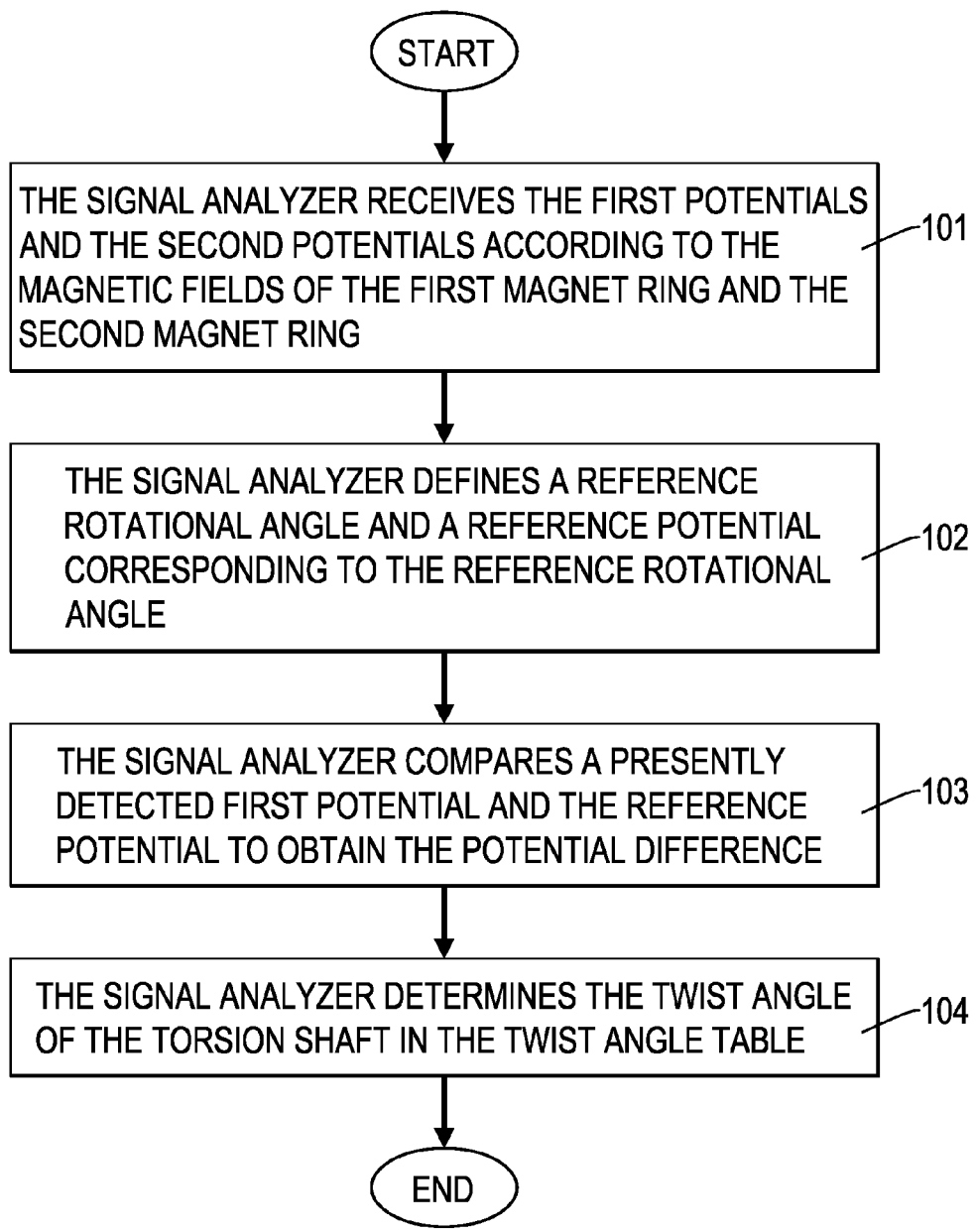
FIG. 10 is a flow chart for obtaining the twist angle.

In brief, the signal analyzer 31 determines the twist angle ($\Delta\psi$) through the steps as shown in FIG. 10.

The signal analyzer 31 receives the first potentials and the second potentials from the first magnetic sensor 241 and the second magnetic sensor 242. The first magnetic sensor 241 and the second magnetic sensor 242 generate the potential signals based on the magnetic fields of the first magnet ring 231 and the second magnet ring 232 (step 101). The first potentials are regarded as reference potentials.

The signal analyzer 31 defines a reference rotational angle ($\theta r$) and a reference potential (Vr) corresponding to the reference rotational angle ($\theta r$) (step 102).

The signal analyzer 31 compares a presently detected first potential and the reference potential (Vr) at the reference rotational angle ($\theta r$) to obtain the potential difference ($\Delta V$) (step 103).

After the signal analyzer 31 obtains the potential difference ($\Delta V$), the signal analyzer 31 determines the twist angle ($\Delta\psi$) of the shaft unit 20 in the twist angle table 33 (step 104).

Figure 11:
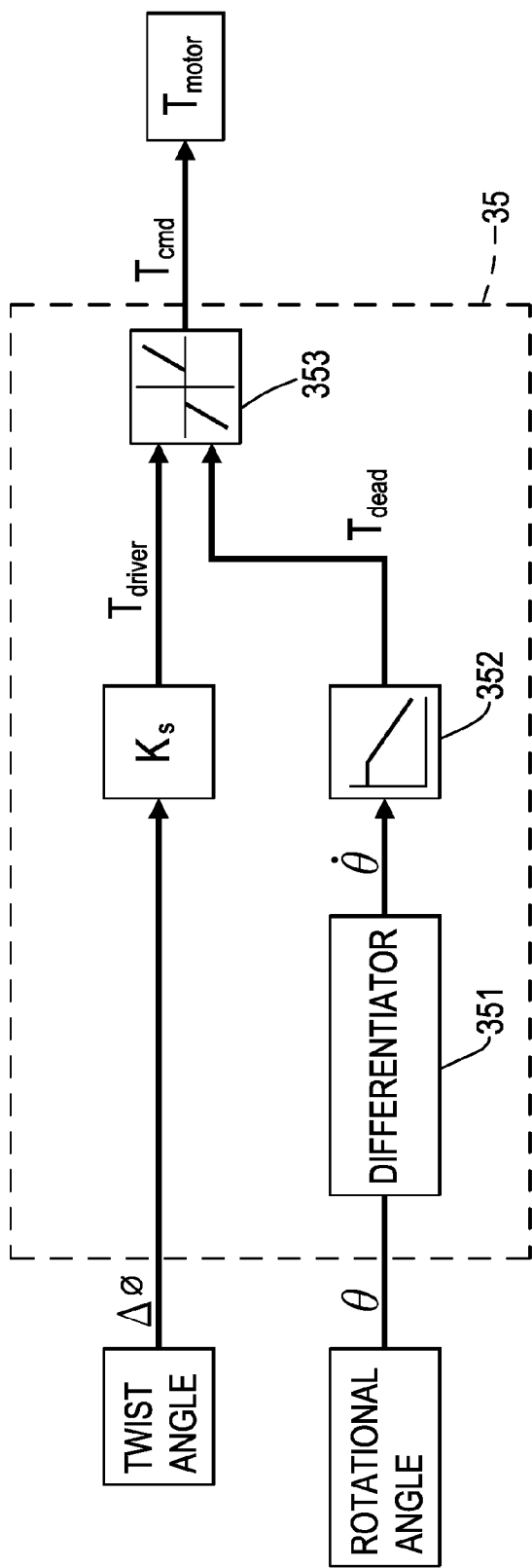
FIG. 11 is a block diagram of the dead zone control module.
Figure 12:
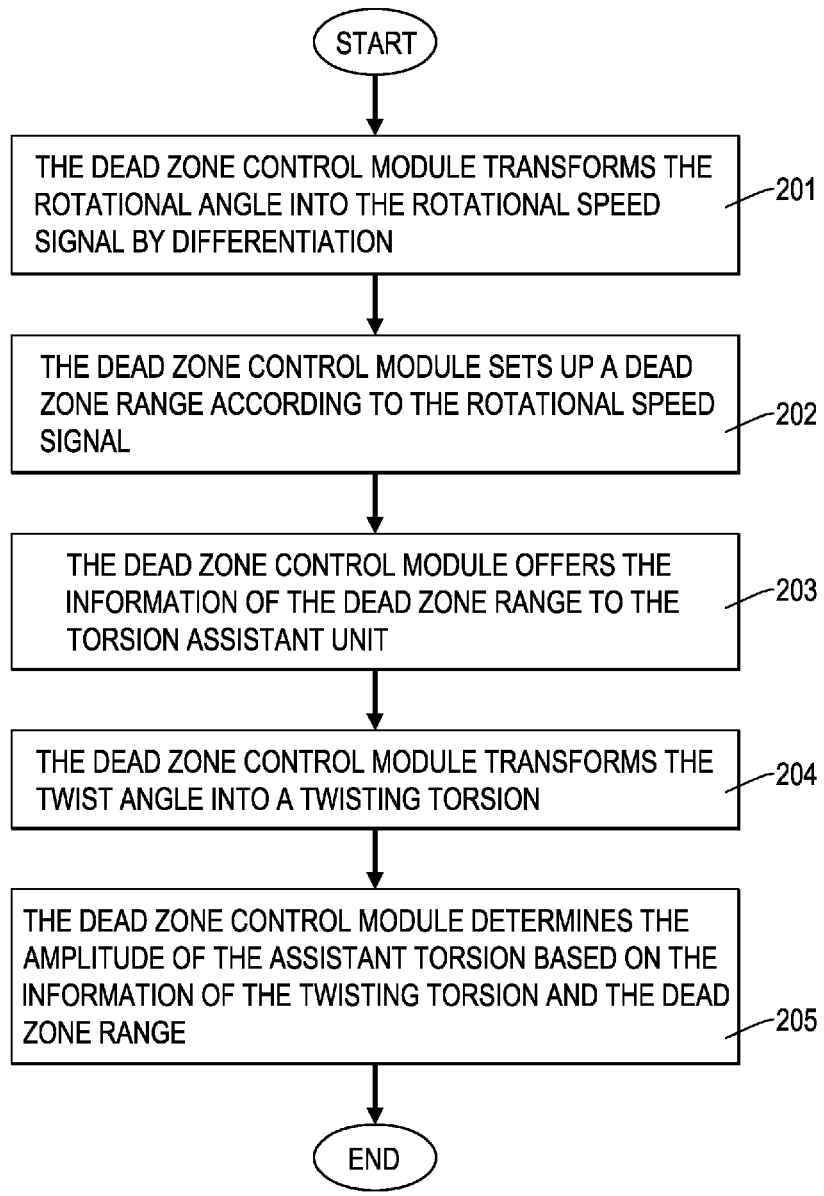
FIG. 12 is a flow chart for obtaining the assistant torsion.

With reference to FIGS. 11 and 12, the controller 30 further has a dead zone control module 35. The dead zone control module 35 has a dead zone setting unit 352 and a torsion assistant unit 353. The dead zone control module 35 receives the rotational angle ($\theta$) and the twist angle ($\Delta\psi$) of the shaft unit 20 from the signal analyzer 31.

The dead zone control module 35 transforms the twist angle (Δψ) into a twisting torsion (Tdriver) based on a material stiffness coefficient (Ks).

The differentiator 351 transforms the rotational angle (θ) into a rotational speed signal (θ̇) by differentiation. The dead zone setting unit 352 transforms the rotational speed signal (θ̇) into the dead zone range (Tdead). The dead zone range (Tdead) means a particularly rotational angle of the shaft unit 20.

After the torsion assistant unit 353 receives the information of the dead zone range (Tdead) and the twisting torsion (Tdriver), the dead zone control module 35 determines the amplitude of an assistant torsion (Tcmd) based on the received information. Finally, the dead zone control module 35 outputs an assistant torsion signal (Tmotor) to the motor 40 based on the assistant torsion (Tcmd). As a result, when the motor 40 receives the assistant torsion signal (Tmotor), the motor 40 outputs the pushing force according to the assistant torsion signal (Tmotor).

In brief, the assistant torsion (Tcmd) is obtained by the steps as shown in FIG. 12.

The dead zone control module 35 transforms the rotational angle (θ) into the rotational speed signal (θ̇) by differentiation (step 201).

The dead zone setting unit 352 of the dead zone control module 35 sets up the dead zone range (Tdead) according to the rotational speed signal (θ̇) (step 202).

The dead zone control module 35 offers the information of the dead zone range (Tdead) to the torsion assistant unit 353 (step 203).

The dead zone control module 35 transforms the twist angle (Δψ) into a twisting torsion (Tdriver) according to the material stiffness coefficient (Ks) (step 204).

The dead zone control module 35 determines the amplitude of the assistant torsion (Tcmd) based on the information of the twisting torsion (Tdriver) and the dead zone range (Tdead) (step 205).

Figure 13:
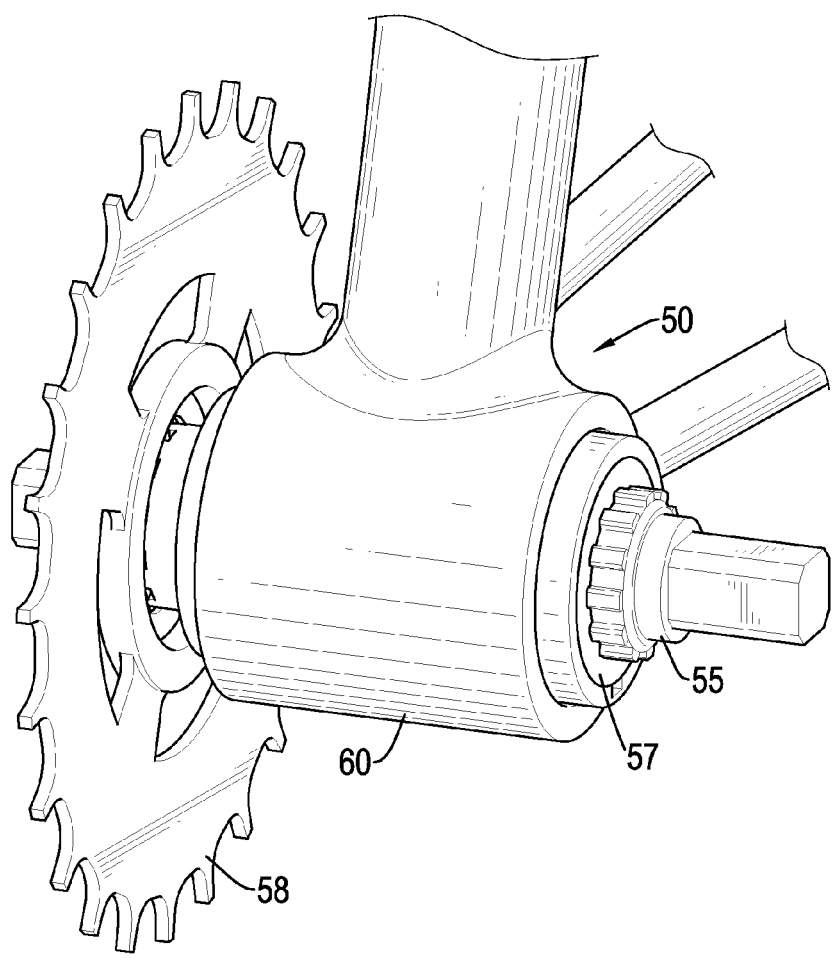
FIG. 13 is a perspective view of a second embodiment of the invention.
Figure 14:
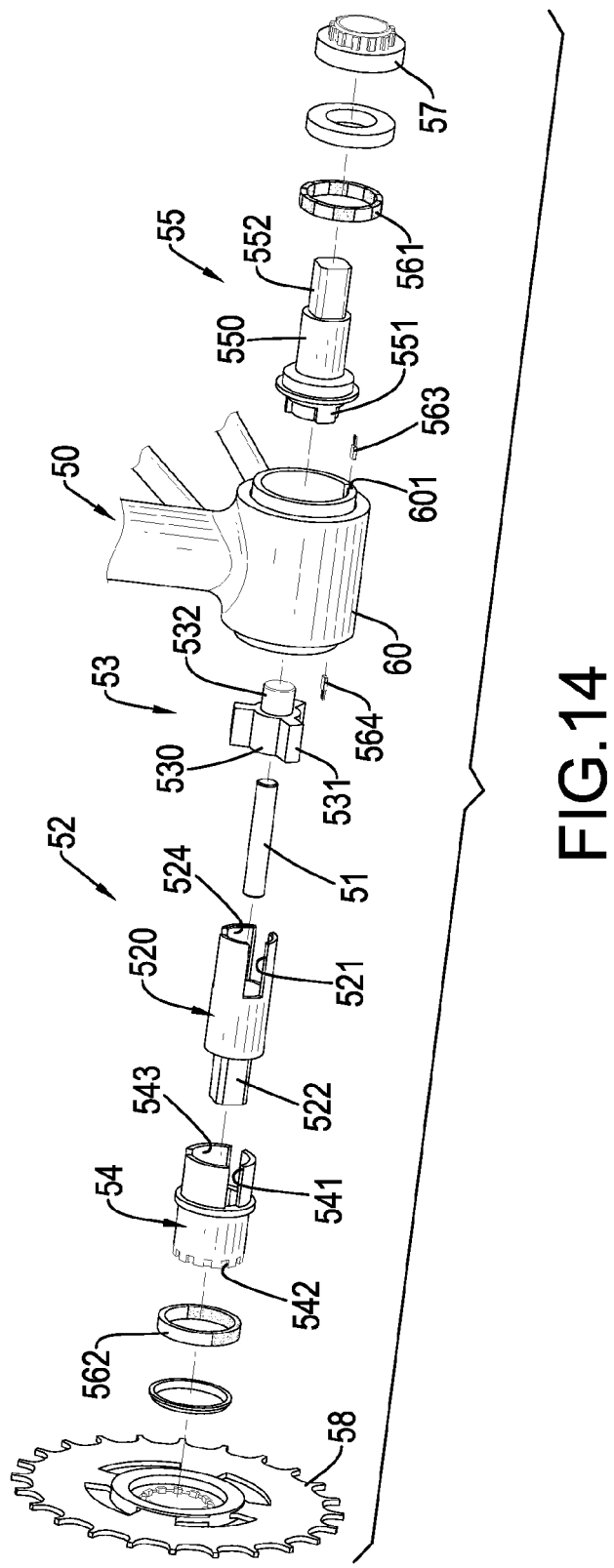
FIG. 14 is an exploded perspective view of the second embodiment of the invention.
Figure 15:
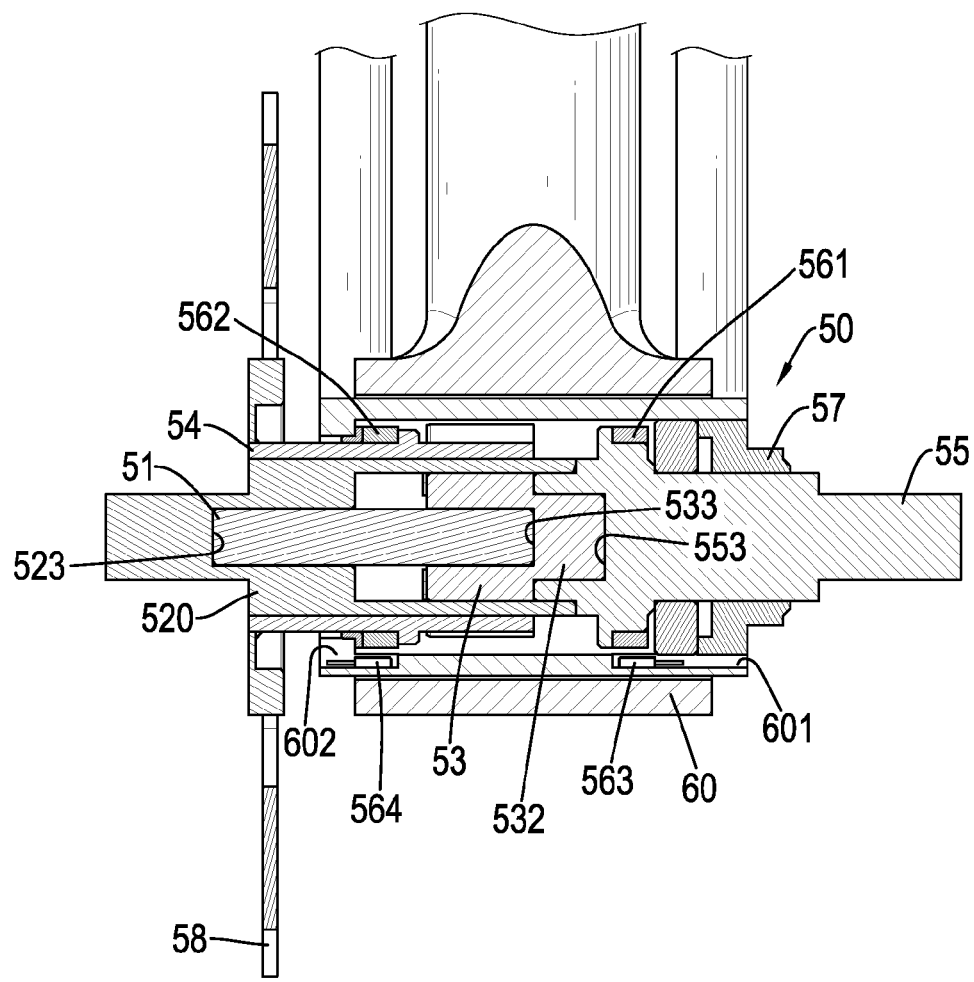
FIG. 15 is a partially cross-sectional view of the second embodiment of the invention.

With reference to FIGS. 13-15, the detection apparatus of the invention is applied for a bike frame 50. The bike frame 50 has a shaft shell 60. A compound shaft is pivotally mounted in the shaft shell 60 and has a gear bushing 54, a first bushing 52, a second bushing 53, a torsion shaft 51, a third bushing 55, a fixture nut 57 and a gear 58. The first bushing 52 and the third bushing 55 act as the first portion 21 of the shaft unit 20 as illustrated in FIG. 2. The second bushing 53, the gear bushing 54 and the gear 58 act as the second portion 22 of the shaft unit 20 as illustrated in FIG. 2.

The fixture nut 57 is securely pressed in the shaft shell 60 for blocking the gear bushing 54, the first bushing 52, the second bushing 53, the torsion shaft 51 and the third bushing 55 in the shaft shell 60.

The gear bushing 54 has a first end, a second end, three grooves 541, an engagement portion 542 and a through hole 543. The engagement portion 542 is formed on the second end of the gear bushing 54. The grooves 541 are formed on the first end and communicate with the through hole 543. The engagement portion 542 is adapted to connect to the gear 58. The gear 58 as a load is adapted to connect to a chain. The second magnet ring 562 is mounted around the second end of the gear bushing 54. The second magnetic sensor 564 is mounted in a second jack 602 of the shaft shell 60 to detect the magnetic field of the second magnet ring 562.

The first bushing 52 is mounted in the through hole 543 of the gear bushing 54 and has a body 520, three grooves 521, a pillar 522 and an engagement hole 523. The body 520 has a first end with an opening 524 and a second end. The pillar 522 protrudes from the second end of the body 520 and extends out of the second end of the gear bushing 54. The grooves 521 are formed on the first end of the body 520 and communicate with the opening 524 and respectively correspond to the grooves 541 of the gear bushing 54. The engagement hole 523 is formed in the pillar 522 and communicates with the opening 524.

The second bushing 53 is mounted in the opening 524 of the first bushing 52 and has a body 530, three ribs 531, a pillar 532 and an aperture 533. The body 530 has an exterior surface, a first end and a second end. The ribs 531 are formed on the exterior surface of the body 530 and respectively extend through the grooves 521, 541 of the first bushing 52 and the gear bushing 54. The aperture 533 is formed in the second end of the body 530 and opposite to the engagement hole 523 of the first bushing 52. The pillar 532 is formed on the first end of the body 530. The width of the rib 531 is smaller than that of the groove 521 of the first bushing 52. A gap is formed between the rib 531 and the first bushing 52.

Figure 16:
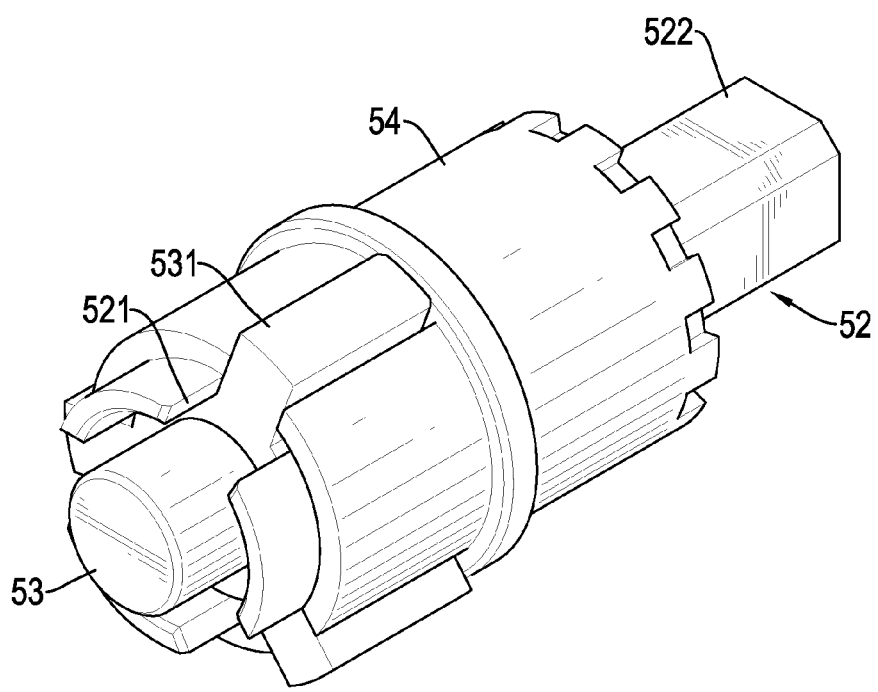
FIG. 16 is a combination view of a gear bushing, a first bushing, a shaft and a second bushing.
Figure 17A:
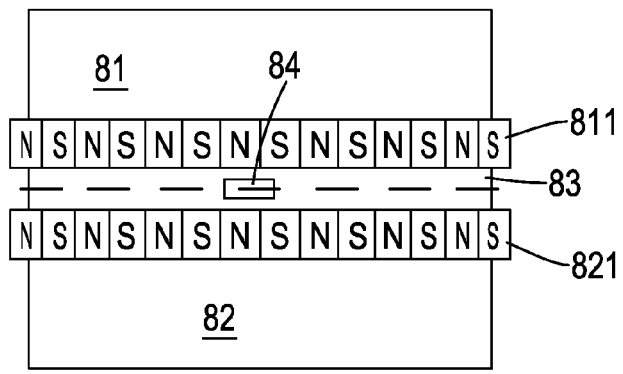
FIGS. 17A and 17B are plan views of a first conventional detection device.
Figure 17B:
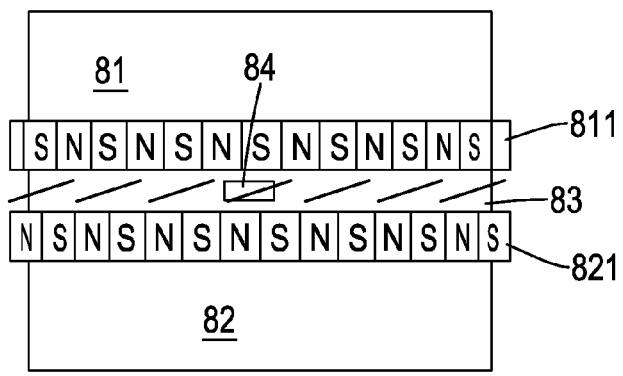
Figure 18:
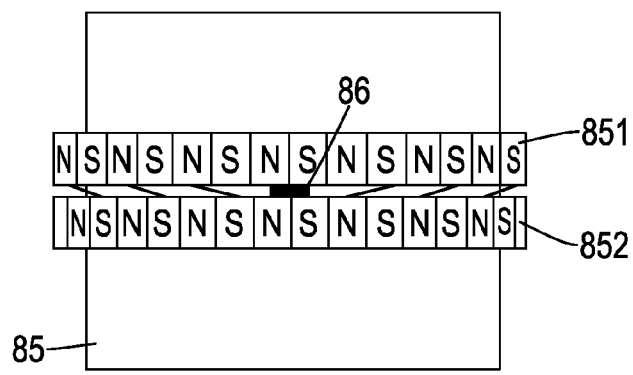
FIG. 18 is a plan view of a first conventional detection device.
Figure 19:
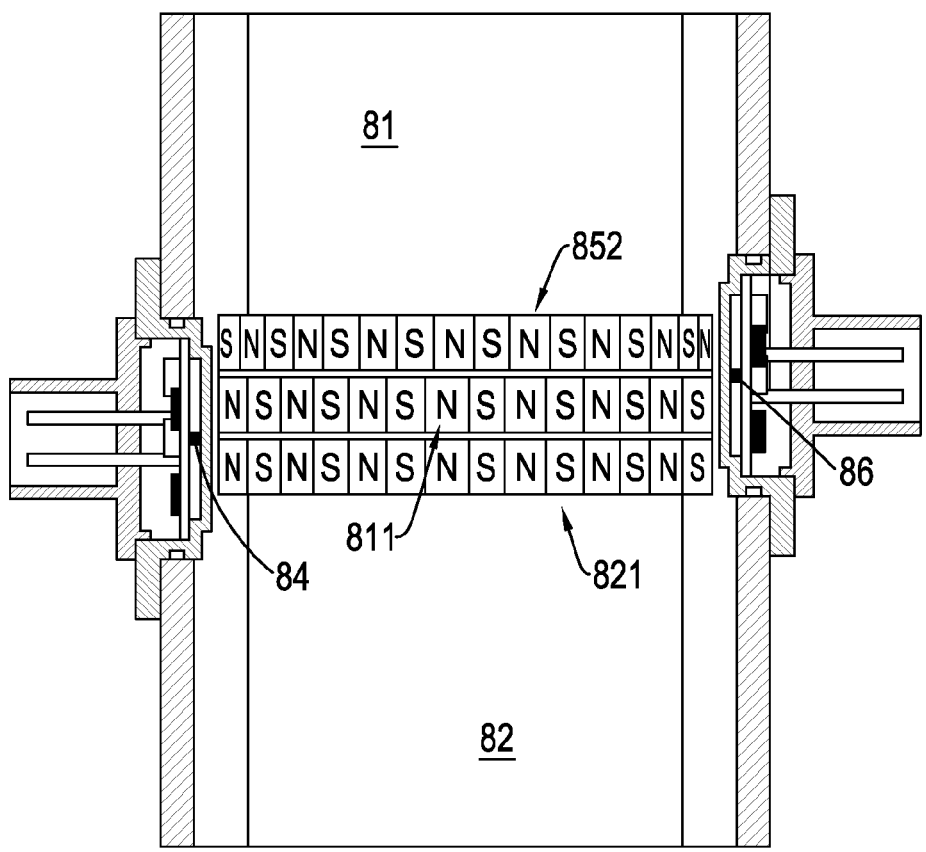
FIG. 19 is a plan view of a first conventional detection device.
Figure 20:
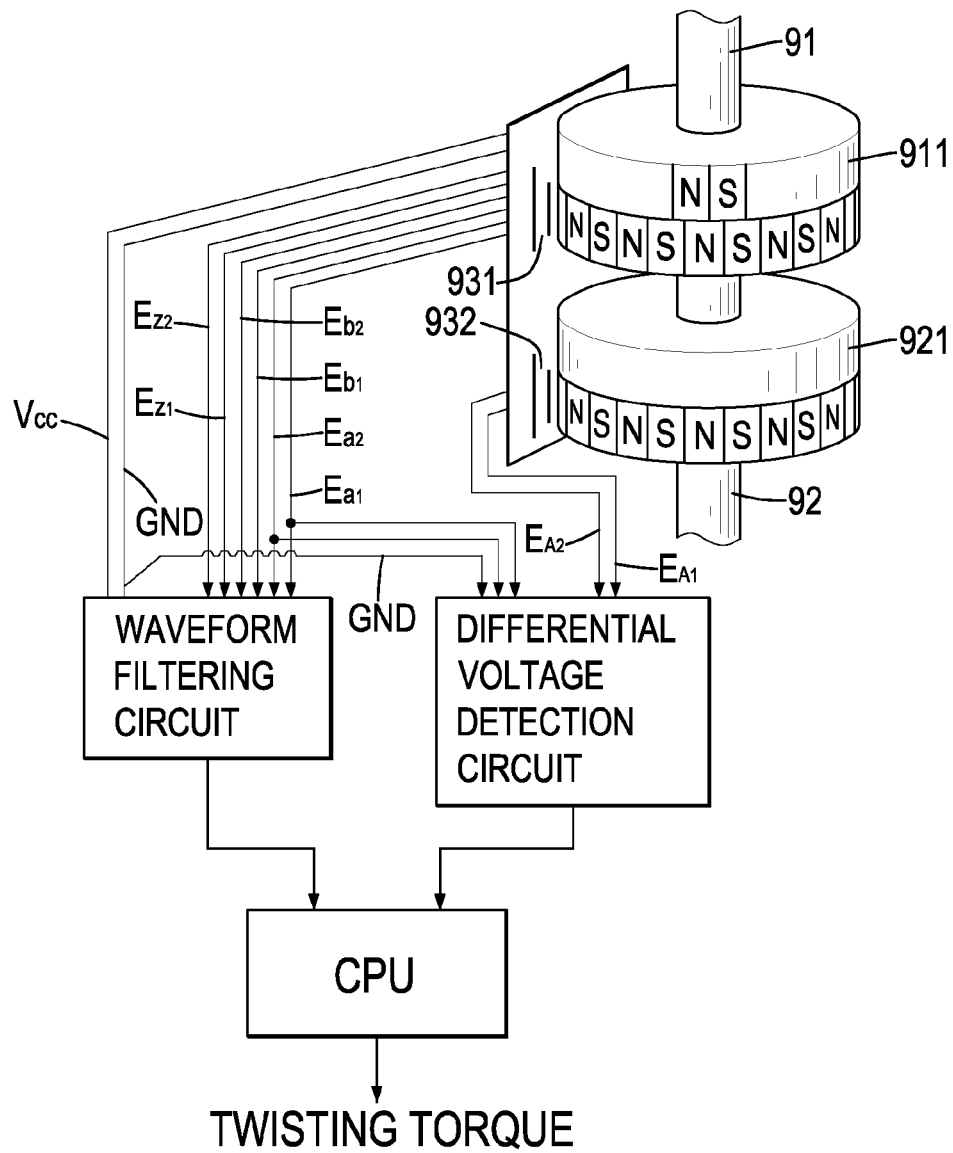
FIG. 20 is an operational view of a second conventional detection device.

The torsion shaft 51 is mounted between the first bushing 52 and the second bushing 53. The torsion shaft 51 has a first end and a second end. The first end of the torsion shaft 51 is securely mounted in the aperture 533 of the second bushing 53. The second end of the torsion shaft 51 is securely mounted in the engagement hole 523 of the first bushing 52. With reference to FIG. 16, because the width of the rib 531 is smaller than that of the groove 521 of the first bushing 52, the extent of twisting of the torsion shaft 51 is restricted by the groove 521 of the first bushing 52 to prevent the torsion shaft 51 from being over twisted.

The third bushing 55 has a body 550, three protrusions 551, a pillar 552 and an engagement hole 553. The body 550 has a first end and a second end. The engagement hole 553 is formed in the second end for pivotally holding the pillar 532 of the second bushing 53. The protrusions 551 are formed around the second end of the body 550 and are respectively inserted into the grooves 521 of the first bushing 52. The pillar 552 is formed on the first end of the body 550 and extends out of the fixture nut 57 for connecting to a crank. The first magnet ring 561 is mounted around the body 550 of the third bushing 55. The first magnetic sensor 563 is mounted in a first jack 601 of the shaft shell 60 to detect the magnetic field of the first magnet ring 561.

When a user steps on the crank connected to the third bushing 55, the compound shaft rotates. The first end of the torsion shaft 51 sustains a forward torque (Tz) and the second end of the torsion shaft 51 sustains a backward torque (Tc).

When the backward torque (Tc) is not zero, the torsion shaft 51 is slightly twisted. As a result, the controller 30 detects the twisting torque and twist angle (Δψ) according to the phase shift of the signal waves A, A1 as illustrated in FIG. 8. The controller 30 then automatically activates the motor 40 to provide a pushing force on the bike. The pushing force can effectively assist the user such that the user can ride the bike with ease.

What is claimed is:

1. A method for detecting a rotation direction, comprising the steps of:
   detecting a magnetic field generated from a first magnet ring mounted around a shaft unit by a first magnetic sensor;
   detecting a magnetic field generated from a second magnet ring mounted around the shaft unit by a second magnetic sensor, wherein the first magnet ring and the second magnet ring have different numbers of pairs of poles;
   receiving a first potential and a second potential from the first and second magnetic sensors respectively by a controller;

calculating a rotational angle of the shaft unit according to the second potential by the controller;

comparing the first potential with a reference potential to obtain a potential difference by the controller;

checking a twisting torque exerted on the shaft unit according to the potential difference by using tables set up in the controller, wherein the tables include a twist angle table and a twisting torque table.

2. The method as claimed in claim 1, wherein
the first magnet ring has an even number of pairs of poles; and
the second magnet ring has one pair of poles.

3. The method as claimed in claim 1, wherein an assistant torsion is calculated based on a twist angle and the rotational angle by the steps of:
transforming the potential difference into the twist angle by using the twist angle table;
transforming the rotational angle into a rotational speed signal by differentiation;
setting up a dead zone range according to the rotational speed signal and the twist angle; and
determining the assistant torsion by referring to the dead zone range.

4. The method as claimed in claim 2, wherein an assistant torsion is calculated based on a twist angle and the rotational angle by the steps of:
transforming the potential difference into the twist angle by using the twist angle table;
transforming the rotational angle into a rotational speed signal by differentiation;
setting up a dead zone range according to the rotational speed signal and the twist angle; and
determining the assistant torsion by referring to the dead zone range.

5. The method as claimed in claim 3, wherein the reference potential is defined according to a rotational angle of the shaft unit when a torque exerted on the shaft unit is zero.

6. The method as claimed in claim 4, wherein the reference potential is defined according to a rotational angle of the shaft unit when a torque exerted on the shaft unit is zero.

7. The method as claimed in claim 1, wherein the twist angle table is established based on relationships between the potential differences and twist angles, each potential difference corresponds to a twist angle.

8. The method as claimed in claim 7, wherein the twisting torque table is established based on relationships between the twist angles and multiple twisting torques, each twist angle corresponds to a twisting torque.

9. A contactless detection apparatus for detecting a rotation direction, the detection apparatus comprising:
a first magnet ring with multiple pairs of a north pole and a south pole and mounted around a first end of a shaft unit, wherein a number of the pairs is even;
a second magnet ring with one pair of a north pole and a south pole and mounted around a second end of the shaft unit;
a first magnetic sensor mounted beside the first magnet ring for detecting a magnetic field of the first magnet ring;
a second magnetic sensor mounted beside the second magnet ring for detecting a magnetic field of the second magnet ring; and
a controller electrically connected to the first magnetic sensor and the second magnetic sensor and having a signal analyzer, wherein the signal analyzer refers to a phase shift of the reference potential and the magnetic field of the first magnet ring to calculate a twisting torque exerted on the torsion shaft and to calculate a rotational angle of the shaft unit according to the magnetic field of the second magnet ring.

10. The detection apparatus as claimed in claim 9, wherein the controller has a dead zone control module having:
a differentiator outputting a rotational speed signal according to the rotational angle;
a dead zone setting unit outputting a dead zone range according to the rotational speed signal; and
a torsion assistant unit determining an assistant torsion according to the dead zone range and a twisting torsion.

11. The detection apparatus as claimed in claim 10, wherein the shaft unit has:
a gear;
a gear bushing having:
a first end;
a second end; the second magnet ring mounted around the second end of the gear bushing;
a through hole;
three grooves formed on the first end and communicating with the through hole; and
an engagement portion formed on the second end of the gear bushing and connected to the gear;
a first bushing mounted in the through hole of the gear bushing and having:
a body having a first end with an opening and a second end;
a pillar protruding from the second end of the body;
three grooves formed on the first end of the body and communicating with the opening and respectively corresponding to the grooves of the gear bushing; and
an engagement hole formed in the pillar and communicating with the opening of the body;
a second bushing mounted in the opening of the first bushing and having:
a body having an exterior surface, a first end and a second end;
three ribs formed on the exterior surface of the body of the second bushing and respectively extending through the grooves of the first bushing and the gear bushing;
an aperture formed in the second end of the body of the second bushing and opposite to the engagement hole of the first bushing; and
a pillar formed on the first end of the body of the second bushing;
the width of the rib is smaller than that of the groove of the first bushing;
a torsion shaft having:
a first end securely mounted in the aperture of the second bushing;
and
a second end securely mounted in the engagement hole of the first bushing;
a third bushing having:
a body having a first end and a second end; the first magnet ring mounted around the body of the third bushing;
an engagement hole formed in the second end for pivotally holding the pillar of the second bushing;
three protrusions formed around the second end of the body of the third bushing and respectively inserted into the grooves of the first bushing; and
a pillar formed on the first end of the body of the third bushing.

* * * * *